United States Patent
Satran et al.

Patent Number: 5,863,156
Date of Patent: Jan. 26, 1999

[54] CUTTING TOOL ASSEMBLY

[75] Inventors: Amir Satran, Kfar Vradim; Dina Agranovsky, Nahariya, both of Israel

[73] Assignee: Iscar Ltd., Migdal Tefen, Israel

[21] Appl. No.: 818,654

[22] Filed: Mar. 19, 1997

[30] Foreign Application Priority Data

Mar. 19, 1996 [IL] Israel ......................................... 117552

[51] Int. Cl.⁶ ..................................................... B23C 5/24
[52] U.S. Cl. ................................ 407/36; 407/38; 407/44; 407/45
[58] Field of Search .............................. 407/36, 38, 37, 407/39, 44, 45

[56] References Cited

U.S. PATENT DOCUMENTS

| | | |
|---|---|---|
| 3,195,376 | 7/1965 | Bader . |
| 3,490,118 | 1/1970 | Corti ...................................... 407/45 X |
| 3,662,444 | 5/1972 | Erkfritz . |
| 3,847,555 | 11/1974 | Pegler et al. ............................... 407/36 |
| 4,309,132 | 1/1982 | Adamson et al. . |
| 4,623,284 | 11/1986 | Greiff ........................................ 407/38 |
| 4,627,771 | 12/1986 | Kieninger . |
| 5,120,166 | 6/1992 | Woerner ................................ 407/44 X |

FOREIGN PATENT DOCUMENTS

| | | |
|---|---|---|
| 126432 | 11/1984 | European Pat. Off. . |
| 0282090 | 6/1992 | European Pat. Off. . |
| 2084319 | 12/1971 | France . |
| 1 175 963 | 4/1965 | Germany . |

*Primary Examiner*—Andrea L. Pitts
*Assistant Examiner*—Henry W. H. Tsai
*Attorney, Agent, or Firm*—Pennie & Edmonds LLP

[57] ABSTRACT

A cutting tool assembly including a cutter body having a cutting unit receiving pocket for releasably receiving a cutting unit with an operative cutting edge and an abutment surface remote therefrom. An elongated bore adapted for receiving an adjustment device is formed in the cutter body, the bore opening into the receiving pocket adjacent the abutment surface. The adjustment device includes an elongated tubular adjustment member having a longitudinally directed adjustment surface inclined with respect to its longitudinal axis, and an elongated adjustment screw initially slidingly extending through the adjustment member. The adjustment member is secured on the adjustment screw such that upon screwing the adjustment screw in a given direction, the adjustment member pushes the cutting unit outward.

14 Claims, 5 Drawing Sheets

CUTTING TOOL ASSEMBLY

FIELD OF THE INVENTION

The invention is generally in the field of cutting tool assemblies having adjusting means for the outward adjustment of an operative cutting edge in an adjustment direction substantially transverse thereto In particular, the invention relates to milling cutters with adjusting means for the outward adjustment of their cutting units to reduce axial runout.

BACKGROUND OF THE INVENTION

A milling cutter has an axis of rotation and a cutter body with a peripheral face and an end face, the cutter body being formed with a plurality of peripherally formed receiving pockets adapted for releasably receiving a like number of cutting units. The cutting units have operative cutting edges substantially radially disposed in the end face and substantially radially directed abutment surfaces remote from the end face. A milling cutter's operative cutting edges are perpendicular to the axis of rotation to wipe a work surface whose smoothness is a function of the axial distance between its least and most axially outward operative cutting edges, the distance being known as "axial runout".

It is known to provide a milling cutter with a plurality of adjustment devices for the independent axial adjustment of each cutting unit. Each adjustment device comprises screw means engaging an adjustment member directly or indirectly pressing against a cutting unit for positively pushing the same axially outward on rotation of the screw means in a given direction. In contrast, any inward axial displacement of a cutting unit requires an initial rotation of the screw means in the opposite direction prior to the application of an externally inward axial force, for example, as applied by light impacts.

Consequently, axial runout adjustment of a milling cutter typically, but not exclusively, involves the outward axial displacement of its least axially outward cutting units so as to be ideally co-planar with its initially most axially outward cutting unit, whereby axial runout is a desirable zero. In order that adjustment devices are good for a number of axial runout adjustments which may occur regularly as part of a workshop's maintenance schedule, they require periodic re-setting such that all the cutting edges of a fresh set of cutting units yet to be axially adjusted are relatively axially inward.

Of considerable significance is that an adjustment member is suitably shaped and dimensioned so as to be snugly received in a cylindrical bore formed in a cutter body such that it can provide suitable axial support to a cutting unit abutting thereagainst during a machining operation and, at the same time, its seating remains undisturbed during the replacement of a worn cutting unit.

It is known to employ differential screws as screw means in adjusting means for milling cutters, for example, as described in EP 0 282 090 B1 and U.S. Pat. No. 3,195,376, however, such arrangements suffer, in particular, from the disadvantage that the receiving nut portions in a cutter body are required to be of extremely high accuracy for the smooth operation of the adjusting means over their entire adjustment range.

In the specific examples illustrated and shown, the adjustment device of the former includes a substantially cylindrical, elongated, tubular adjustment member with a longitudinally directed, planar adjustment surface inclined with respect to its longitudinal axis such that its radial displacement in a given direction causes an outward axial displacement of its abutting cutting unit. Against this, the adjustment device of the latter includes a conical, elongated, tubular adjustment member with a longitudinally directed, quadrant shaped, curved adjustment surface eccentric with respect to its longitudinal axis such that its rotation in a given direction causes an outward axial displacement of its abutting cutting unit.

In an alternative approach avoiding the use of differential screws, DE 1 175 963 describes a milling cutter with adjustment devices each having a semi-cylindrical, elongated, tubular adjustment member which is displaced radially inward along a support wall inclined towards the end face on the screwing in of an abutting adjustment screw, thereby causing the outward axial displacement of a cutting unit abutting thereagainst. However, no provision is made for the outward radial displacement of an adjustment member on the screwing out of its respective adjustment screw which thereby complicates its replacement, if necessary, and the miller cutter's periodic resetting.

SUMMARY OF THE INVENTION

It is an object of the present invention to provide a cutting tool assembly with adjusting means for the outward adjustment of an operative cutting edge in an adjustment direction substantially transverse thereto for machining a work surface to a smooth finish.

In accordance with the present invention, there is provided a cutting tool assembly comprising a cutter body having a cutting unit receiving pocket for releasably receiving a cutting unit with an operative cutting edge and an abutment surface remote therefrom;

an elongated bore formed in the cutter body and opening into said receiving pocket adjacent said abutment surface;
an adjustment device located in said bore and comprising:
an elongated tubular adjustment member longitudinally slidable in said bore and having a longitudinally directed adjustment surface inclined with respect to its longitudinal axis for abutting relationship with said abutment surface;
an elongated adjustment screw initially slidingly extending through said adjustment member for bi-directional screw displacement in respect of said cutter body;
adjustment member inter-engaging means for abutting transmission of said bi-directional screw displacement to said adjustment member whereby screw displacement in a given direction results in an outward displacement of said cutting unit in an adjustment direction substantially transverse to said operative cutting edge.

In accordance with the present invention, a cutting tool assembly can be adapted for either single or multiple operative cutting edge machining operations, for example, tuning or milling, respectively. Depending on the implementation, an adjustment device typically has a full stroke of between about 3 mm–5 mm and provides for an outward adjustment of about 150μm per mm of stroke.

Each adjustment member preferably has a right cylindrical abutment surface and a planar adjustment surface, thereby being readily manufacturable at strict tolerances. Whilst the adjustment surface can be inclined in either direction, the difference arising therefrom being in the direction of rotation of the adjustment screw required to achieve an outward adjustment, the adjustment surface is preferably inclined such that its leading end towards the screw threaded leading end of the adjustment screw is closer towards its longitudinal axis than its trailing end.

Preferably, a cutting unit's abutment surface protrudes through an elongated slot for abutment against an adjustment surface, thereby enabling a slot of reduced width to be employed which, in turn, facilitates a greater angular abutment between an adjustment member and the support wall of its receiving bore for a more secure seating. Such an abutment surface is preferably planar and constituted by a pair of spaced apart, co-planar abutment surfaces for a more accurate abutment arrangement.

A cutting unit can be constituted by a cutting insert for direct abutment against an adjustment surface or, alternatively, and particularly in the case of a milling cutter, by a seating element in which a cutting insert is releasably retained therein. Such seating elements are known by different names in the art, for example, a seat, a shoe, and a cartridge.

BRIEF DESCRIPTION OF THE DRAWINGS

For a better understanding of the present invention and to show how the same can be carried out in practice, reference will now be made to the accompanying drawings, in which.

DETAILED DESCRIPTION OF THE PREFERRED EMBODIMENT

Figure 1:
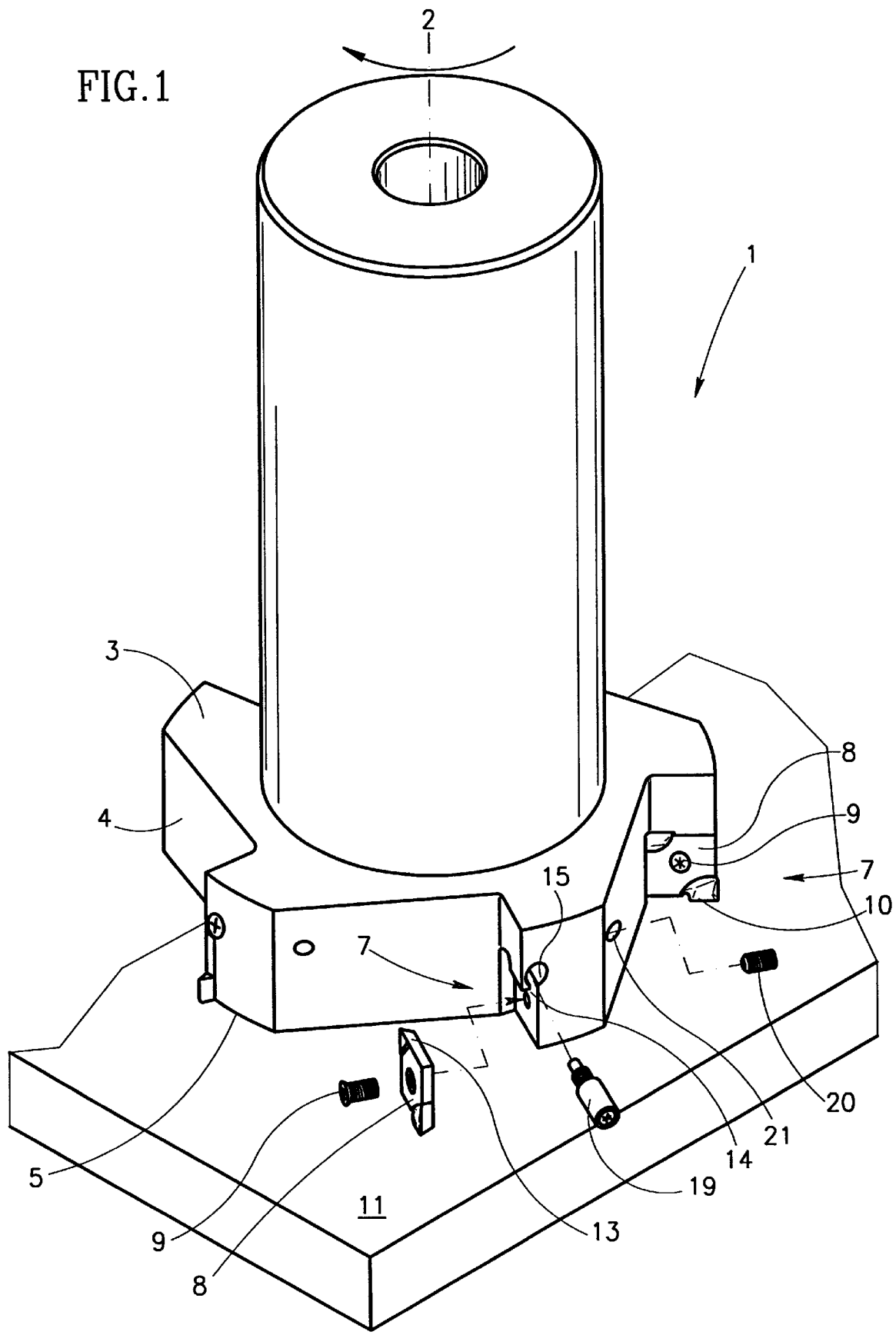
FIG. 1 is a partial perspective view of a milling cutter.

In FIG. 1, a milling cutter, generally designated 1, has an axis of rotation 2 and includes a cutter body 3 with a peripheral face 4 and an end face 5, the cutter body 3 being formed with a plurality of peripherally disposed insert receiving pockets 7 for releasably receiving a like number of cutting inserts 8.

Each cutting insert 8 is secured in an insert receiving pocket 7 by a clamping screw 9, thereby presenting an operative cutting edge 10 substantially radially disposed in the end face 5 and perpendicular to the axis of rotation 2 for wiping a work surface 11.

Figure 2:
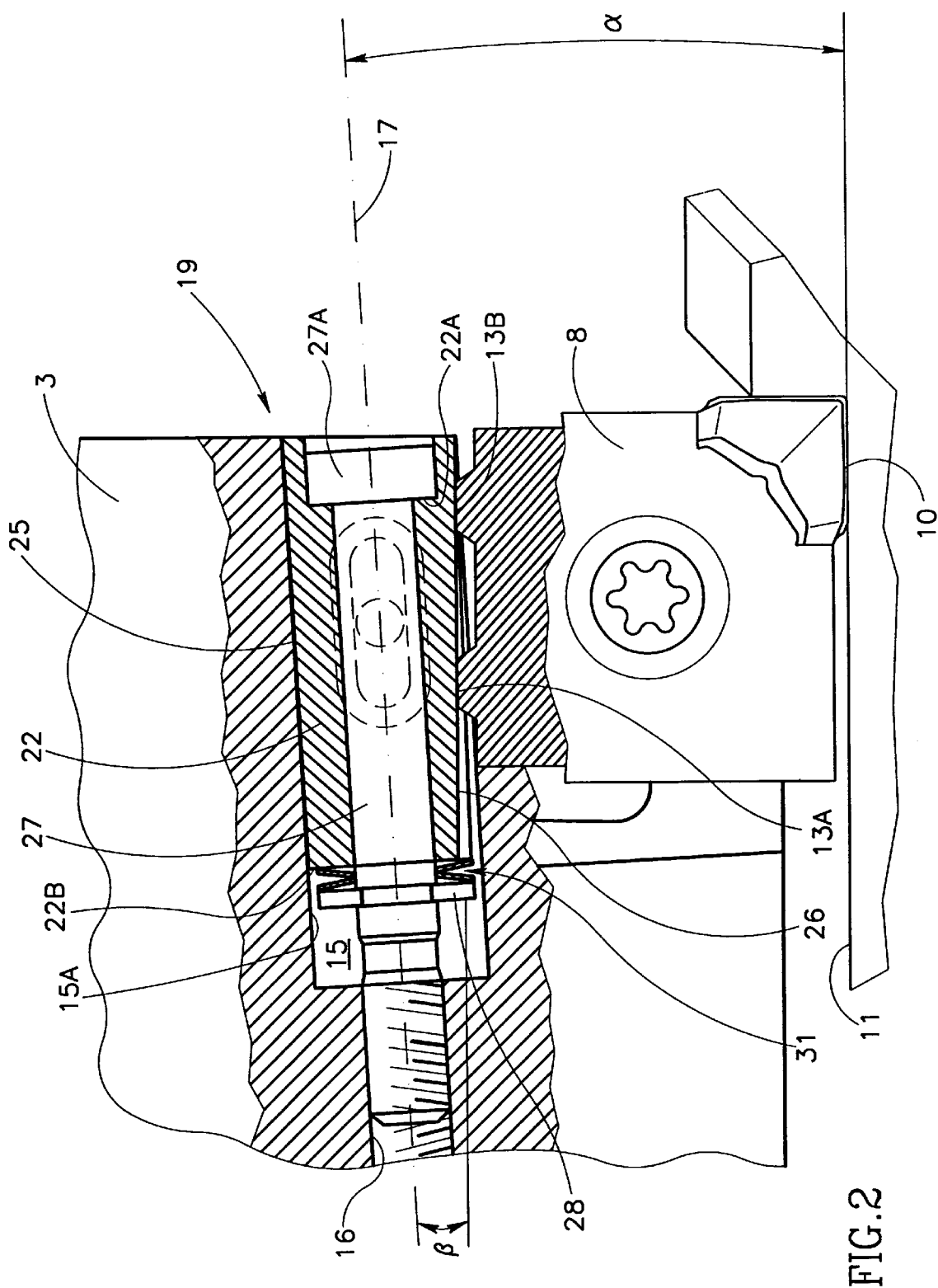
FIGS. 2 and 3 are respectively partially cut away top and side views of a portion of the milling cutter of FIG. 1.
Figure 3:
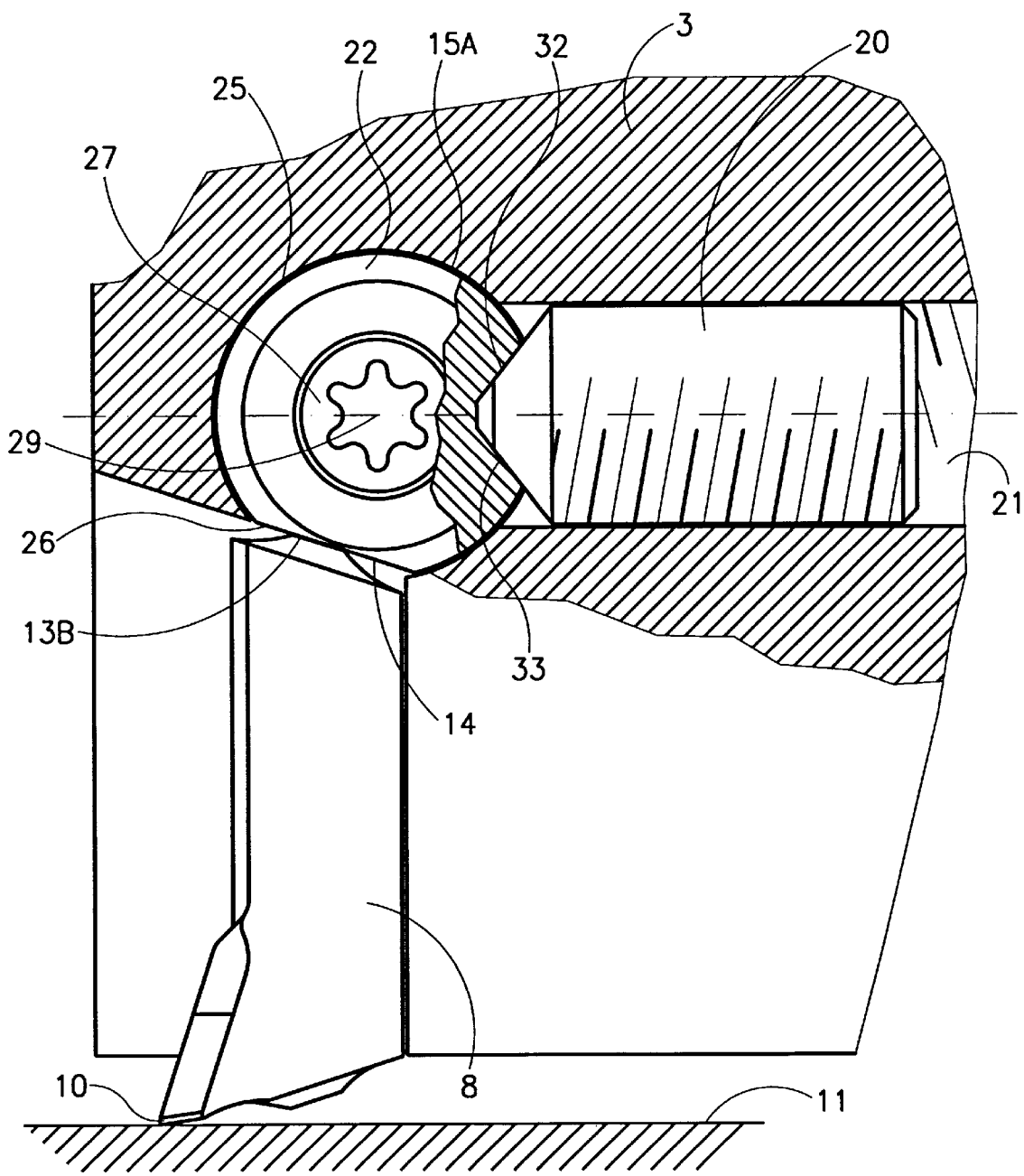

Remote from the end face 5, each cutting insert 8 has an abutment surface 13 parallel to its cutting edge 10. As shown in FIGS. 2 and 3, the abutment surface 13 is preferably constituted by a pair of co-planar, inclined spaced apart abutment surfaces 13A and 13B, thereby providing a more accurate abutment arrangement than a single abutment surface 13.

Opening into each insert receiving pocket 7 along a relatively narrow elongated slot 14 so as to be adjacent to an abutment surface 13 is a substantially radially directed right cylindrical bore 15 with a nearly complete cylindrical support wall 15A. As shown in FIG. 2, a bore 15 terminates in a right threaded tapped bore section 16 having a longitudinal axis 17 subtending an angle of inclination α with the work surface 11.

As shown in FIGS. 2 and 3, snugly disposed within a bore 15 is an adjustment device 19 adapted for screwing in and out of the cutter body 3 whereby its inward radial displacement correspondingly adjusts the outward axial projection of the cutting insert 8 abutting thereagainst. The position of an adjustment device 19 along a bore 15 is secured by a grubb screw 20 displaceable along a screw threaded bore 21 transversely directed to a bore 15 (see FIGS. 1 and 3).

Figure 4:
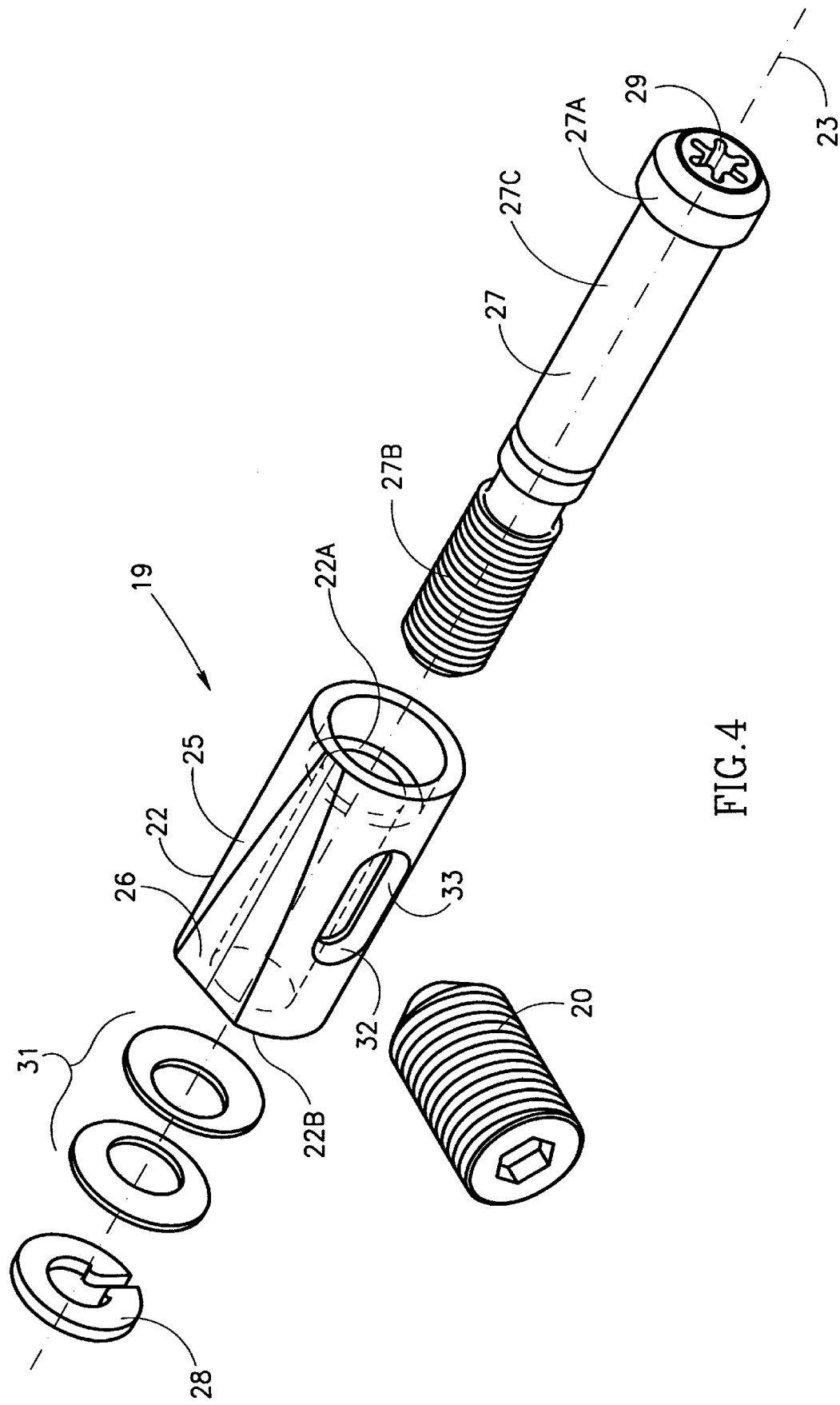
FIGS. 4 and 5 are respectively exploded and assembled perspective views of an adjustment device of the milling cutter of FIG. 1.
Figure 5:
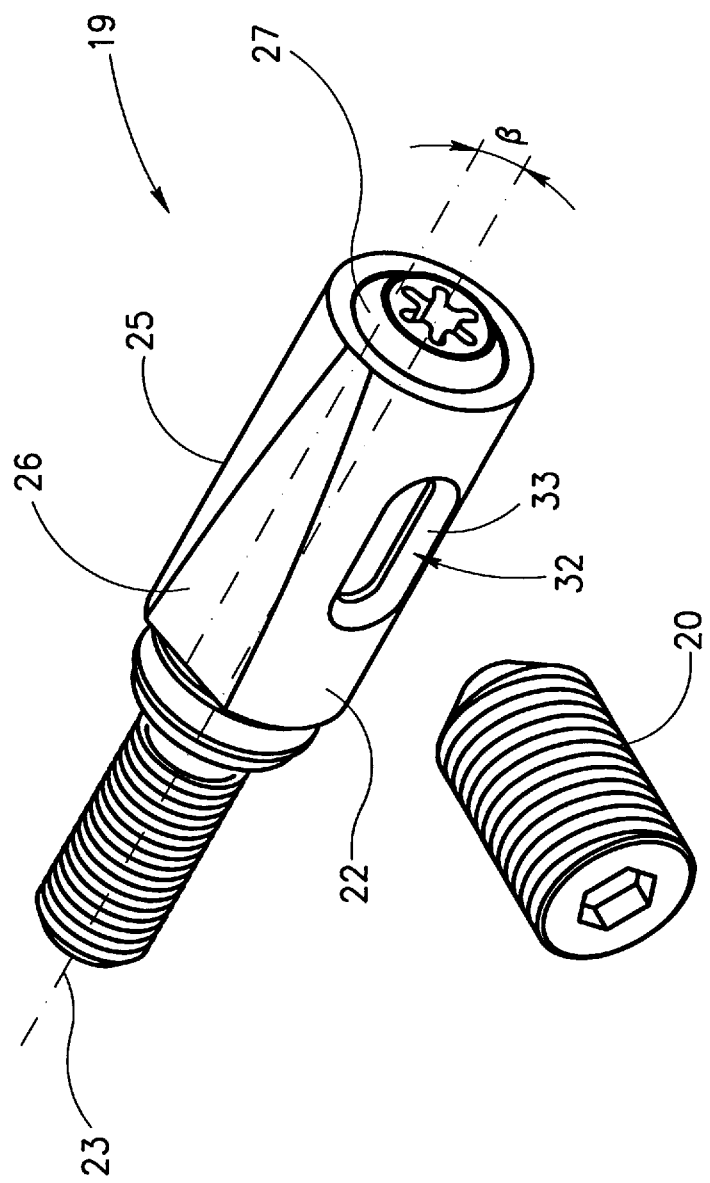

As shown in FIGS. 4 and 5, an adjustment device 19 comprises an elongated tubular adjustment member 22 having a longitudinal axis 23 and formed with a right cylindrical abutment surface 25 for a tight sliding fit abutment against the matching bore support wall 15A and a planar adjustment surface 26 for abutment thereagainst of the abutment surface 13. The adjustment surface 26 is inclined relative to the longitudinal axis 23 at an angle of inclination β (see FIGS. 2 and 5) such that its leading end is radially closer thereto than its trailing end. By virtue of a cutting insert's abutment surfaces 13A and 13B being parallel to its front cutting edge 10, necessarily, the angles of inclination α and β are equal. Typically, the angle of inclination β lies between 8° and 12° such that the adjustment surface 26 can slide along the abutment surfaces 13A and 13B without self-locking.

The adjustment member 22 is rotatably mounted on an adjustment screw 27 which initially slidingly extends therethrough and whose head 27A abuts against a recessed shoulder 22A formed in the adjustment member's trailing end and is retained thereon by a retaining clip 28. The head 27A is formed with internal wrenching surfaces 29 by which the adjustment device 19 is screwed in and out of the cutter body 2. During a reverse screwing direction, backlash between the adjustment screw 27 and the adjustment member 22 is inhibited by a pair of Belleville springs 31 partially compressed between the adjustment member leading end surface 22B and the retaining clip 28. As seen in FIGS. 2 and 4, the screw 27 also comprises a threaded portion 27B and a screw shaft 27C, with the springs 31 and the retaining clip 28 being engaged to the latter, upon initial insertion of the screw 27.

As shown in FIG. 3, a cutting insert's abutment surfaces 13A and 13B are dimensioned and shaped so as to protrude through a slot 14. The correspondingly required angular orientation of the adjustment surface 26 is achieved by its adjacent abutment surface 25 being formed with an elongated groove 32 with longitudinally directed suitably tapering side walls 33 for receiving the grubb screw 20. The groove 32 is elongated so as to enable radial displacement of the adjustment device 19.

The set-up of the milling cutter 1 at minimal axial runout typically involves the independent outward axial adjustment of its cutting inserts by the inward screwing of their respective adjustment screws such that their operative cutting edges lie co-planar with the initially most axially outward cutting insert's cutting edge.

After a number of set-ups, the resetting of the milling cutter 1 is facilitated by virtue of the adjustment members being outwardly radially displaced on the screwing out of their respective adjustment screws from the cutter body. When necessary, one or more adjustment devices can be entirely removed from the miller cutter 1 by its or their full screwing out from the cutter body.

While the invention has been described with respect to a limited number of embodiments, it will be appreciated that many variations, modifications and other applications of the invention can be made. For example, other types of cutting inserts can be employed, e.g. the non-handed, indexable square-shaped cutting insert described in the Applicant's PCT/IL96/00112, in which case the milling cutter 1 requires suitable adaptation for receiving cutting inserts at a dish angle for positioning their cutting edges perpendicular to its axis of rotation.

We claim:

1. A cutting tool assembly comprising a cutter body having a cutting unit receiving pocket for releasably receiving a cutting unit with an operative cutting edge and an abutment surface remote therefrom;
- an elongated bore formed in the cutter body and opening into said receiving pocket adjacent said abutment surface via an elongated slot;
- an adjustment device located in said bore and comprising:
  - an elongated tubular adjustment member longitudinally slidable in said bore and having a longitudinally directed adjustment surface inclined with respect to its longitudinal axis for abutting relationship with said abutment surface; and
  - an elongated adjustment screw initially slidingly extending through said adjustment member for bi-directional screw displacement in respect of said cutter body;
  - said screw being provided with a first abutment surface arranged to abut a corresponding second abutment surface on said adjustment member whereby screw displacement in a first direction results in an outward displacement of said cutting unit in an adjustment direction substantially transverse to said operative cutting edge, and
  - said screw being further provided with a retaining member remote from said first and second abutment surfaces whereby screw displacement in a second direction opposite from said first direction results in a displacement of said adjustment member in said second direction.

2. A cutting tool assembly according to claim 1 wherein said adjustment member has a substantially full tight cylindrical shape with a planar adjustment surface.

3. A cutting tool assembly according to claim 2 wherein said adjustment surface is inclined such that its leading end towards a screw threaded leading end of said adjustment screw is radially closer towards its longitudinal axis that its trailing end.

4. A cutting tool assembly according to claim 1 wherein said adjustment device further comprises spring means for synchronizing displacement of its adjustment member with said bi-directional screw displacement of its adjustment screw.

5. A cutting tool assembly according to claim 1 further comprising angular orientation means for aligning said adjustment surface with said elongated slot.

6. A cutting tool assembly according to claim 1 further comprising securing means for securing said adjustment device along said bore, said securing means comprising a second bore intersecting said first bore, and a second screw occupying said second bore.

7. A cutting tool assembly according to claim 1 wherein said abutment surface protrudes through said elongated slot for abutment against said adjustment surface.

8. A cutting tool assembly according to claim 1 wherein said abutment surface includes a pair of co-planar, spaced apart abutment surfaces.

9. A cutting tool assembly according to claim 1, wherein said assembly comprises a miller cutter.

10. An adjustment device comprising an elongated tubular adjustment member having a longitudinally directed adjustment surface inclined with respect to its longitudinal axis, an elongated adjustment screw slidingly extending through said adjustment member, said adjustment screw being provided with a first abutment surface arranged to abut a corresponding second abutment surface on said adjustment member and a retaining member remote from said first and second abutment surfaces for retaining said adjustment member on said adjustment screw.

11. An adjustment device according to claim 10 wherein said adjustment member has a right cylindrical abutment surface with a planar adjustment surface.

12. An adjustment device according to claim 11 wherein said adjustment surface is inclined to said longitudinal axis such that its leading end is radially closer thereto than its trailing end.

13. An adjustment device according to claim 10 further comprising spring means arranged to synchronize displacement of its adjustment member with a displacement of its adjustment screw.

14. An adjustment device according to claim 10 wherein said adjustment member is formed with an elongated longitudinally directed groove with tapering side walls.

* * * * *